3,274,238
PRODUCTION OF UNSATURATED ESTERS BY OXIDATION OF OLEFINS
Hugo Kojer, Munich, Reinhard Jira, Munich-Pasing, Jürgen Smidt, Munich-Solln, and Heinz Stangl, Munich, Germany, assignors to Consortium für Elektrochemische Industrie G.m.b.H., Munich, Germany
No Drawing. Filed July 23, 1963, Ser. No. 296,902
Claims priority, application Germany, July 26, 1962, C 27,559
4 Claims. (Cl. 260—497)

The present invention relates to an improved process for the production of ethylenically unsaturated esters and more particularly to the production of such esters from olefins, particularly, the lower olefins, and carboxylic acids in the presence of a salt of a metal of the platinum group and an oxidizing agent capable of oxidizing the metallic metal of the platinum group.

The production of vinyl acetate from ethylene and acetic acid in the presence of salts of palladium and oxidizing agents capable of oxidizing metallic palladium is already known (Doklady Akad. Nauk USSR, 133,377). Suitable oxidizing agents for this purpose, for example, are described in German published application 1,080,994 and in Angew. Chem., 71, 178, 1959. Copper-II-chloride is especially suited as such an oxidizing agent as the copper-I-chloride is easily reoxidized with oxygen to reform copper-II-chloride. Although a number of embodiments of such process in analogy to the processes for the production of aldehydes and ketones ((1) Angew. Chem., 71, 178, 1959; (2) Angew. Chem., 74, 93, 1962; (3) German Patent No. 1,142,351) are conceivable, considerable difficulties are encountered when attempting direct application of such embodiments to the production of vinyl acetate. For example, copper-I-chloride which occurs as an intermediate in such process, is difficultly soluble in the water free acetic acid required. In a process in which the catalyst solution is recycled in order, for example, to remove the vinyl acetate formed under pressure by distillation after release of the pressure, whether or not the reaction is carried out with an olefin oxygen mixture or with olefin alone, considerable difficulties are engendered by the precipitation of copper-I-chloride which causes clogging of valves, pumps, conduits and the like.

A single step process in which the olefin oxygen mixture is converted in the presence of the catalyst in a reactor in which the reaction solution remains and from which the reaction products and excess gas must be driven off, however, has the disadvantage that the reaction can only be carried out at only a slightly raised pressure as higher pressures require temperatures which are too high and cause partial decomposition of the vinyl acetate produced.

It is an object of the present invention to provide a process for the production of ethylenically unsaturated esters of the formula $$RCOOCX=CX_2$$

from RCOOH and $CHX=CX_2$ in which R is alkyl or aryl, preferably, lower alkyl, and each X is hydrogen, alkyl or aryl, preferably, hydrogen or lower alkyl, which avoids the aforementioned disadvantages.

In the process according to the invention the ethylenically unsaturated esters are produced from the corresponding olefins and carboxylic acids in the presence of a metal of the platinum group, oxidizing agents, salts of carboxylic acids or compounds which under the conditions of the reaction form the carboxylic acid salts with the carboxylic acid present in a reactor under superatmospheric pressure and the pressure in such reactor is periodically increased or lowered, respectively to effect distillation of the reaction products.

The catalyst of the components indicated above can be in the form of a non-aqueous solution or suspension in the carboxylic acid reactant or such carboxylic acid reactant in admixture with another organic solvent when a liquid phase reaction is involved or can be supported on a solid carrier when a gas phase reaction is concerned. Polar organic solvents such as acetonitrile, benzonitrile and the like are especially suited for use in conjunction with the carboxylic acid when a liquid phase reaction is involved as a large proportion of the catalyst components is soluble therein. However, usually only the carboxylic acid is used for dissolving or suspending the catalyst components.

The organic and inorganic compounds of palladium, such palladium salts as $PdCl_2$, palladium acetate and bis(allyl palladium chloride) $(C_3H_5PdCl)_2$ are especially suited as the palladium metal group compound component of the catalyst but similar compounds of other metals of the platinum group also are effective. In the process according to the invention wherein oxidizing agents are employed it is not necessary, for example, to employ more than 1–20 mmols of palladium compound per liter of catalyst solution or suspension.

Iron III and especially copper II salts such as $CuCl_2$, copper acetate or $FeCl_3$ are particularly suited as the oxidizing agents employed in the process according to the invention. However, compounds of other multivalent heavy metals such as of manganese, cobalt, tin, lead, antimony and vanadium, in their higher valent stage, can also be used. Such oxidizing agents as exemplified by $CuCl_2$ serve to reoxidize the metal of the platinum group which mostly is reduced to the metallic stage during the reaction of the olefin with the carboxylic acid according to the following equation:

(1) $C_2H_4+CH_3COOH+PdCl_2 \rightarrow CH_3COOCH=CH_2+Pd+2HCl$ to the desired reactive oxidation stage of the metal of the platinum group according to the following equation:

(2) $2CuCl_2+Pd \rightarrow PdCl_2+2CuCl$

The sum of equations (1) and (2) can be represented as follows:

(3) $C_2H_4+CH_3COOH+2CuCl_2 \xrightarrow{PdCl_2}$
$CH_3COOCH=CH_2+2CuCl+2HCl$

The oxidizing agent is employed in concentrations of 100–2000 mmols, preferably 500–1500 mmols per liter of catalyst solution or suspension.

The additions of salts of the carboxylic acids concerned in the reaction, especially those of the alkali and alkaline earth metals, for example, lithium acetate, sodium acetate, calcium acetate or the corresponding propionates, increase the velocity of the desired ester formation and at the same time can also serve to increase the solubility of the compounds used as the oxidizing agent. As has already been indicated above, such salts of the carboxylic acid need not be added as such as other salts as the halides when added form the desired carboxylic acid salts by reaction with the carboxylic acid. While the small quantities of carboxylic acid salt ions provided by reaction of for example, $CuCl_2$ or $PdCl_2$ with the carboxylic acid may suffice for promoting the production of a smaller quantity of the desired ester, it is necessary to provide about 0.5–3 mols of the alkali or alkaline earth metal salts per liter of catalyst suspension or solution to obtain good conversions.

The lower olefins, such as ethylene, propylene and butylene, are most suited for the reaction according to the invention as with the higher olefins numerous products are always obtained. Even in the case of propylene, the three isomers isopropenyl-, n-propenyl and allyl acetate can be produced.

It is of importance for the process that it be carried out in the presence of as little water as practical as the presence of water gives rise to the production of carbonyl compounds corresponding to the olefins instead of the desired unsaturated esters. Water is removed together with the reaction products during the distillation. As water is always produced in the reoxidation of the oxidizing agent with oxygen, the formation of carbonyl compounds cannot be avoided entirely when such reoxidation is effected simultaneously with the reaction between the olefin and the carboxylic acid, such as, when olefin oxygen mixtures are supplied to the reaction.

The pressures employed for the reaction of the olefin with the carboxylic acid in the presence of the catalyst practically can be as high as desired. Pressures of about 10–50 atmospheres are expedient. The reaction velocity is quite low at pressures below 10 atmospheres. The pressure to which the reactor is released to effect distillation of the unsaturated ester and other products produced depends upon the temperature employed for the reaction which should not rise above 150–170° C. because of the higher quantities of by-products which would be produced at higher temperatures. The pressure to which the pressure is released and the reaction temperature must be so correlated that the reaction products are driven off at the boiling point of the reaction partner having the highest boiling point, usually the carboxylic acid. For example, if the pressure is reduced to about atmospheric to distill off vinyl acetate, a reaction temperature of about 120–125° C., namely, the boiling temperature of acetic acid, suffices. If it is desired to carry out the reaction at a higher temperature, for example, 150° C., it is not necessary to reduce the pressure to about atmospheric. On the other hand when the reaction is carried out with a higher boiling acid, such as propionic acid, at about 120° C., it is necessary to reduce the pressure to below atmospheric to distill off the reaction products. The preferred temperature range is between about 70 and 140° C.

The period between the respective raising and lowering of the pressure depends upon the conditions of the reaction. In most instances a few minutes, for example, 1–20 minutes suffice. However, with reactions which proceed very slowly it may be up to an hour and over.

The reaction mixture heats up in view of the exothermic nature of the reaction involved and cools down upon release of the pressure through the distillation of the product which occurs thereby. The heat of reaction is therefore utilized in the distillation.

It is expedient to provide for a good gas-liquid distribution in the reactor when suspensions or solutions of the catalyst in liquid carboxylic acid alone or in combination with another solvent are employed for the reaction. This, for example, can be achieved by continuous passage of the gaseous olefin alone or in combination with oxygen through the catalyst and carboxylic acid containing liquid, and recycling the unreacted portions thereof after replenishing the reacted portions or by carrying out the reaction in a vessel provided with a stirrer in which case the gaseous olefin or gaseous olefin oxygen mixture need only be supplied to such vessel under pressure and be allowed to react to a far-reaching degree. Any excess gas in the latter instance can, of course, be recycled after the release of pressure.

In the reaction corresponding to the summation Equation 3, $CuCl_2$ is reduced to $CuCl$. In the presence of oxygen the $CuCl$ is again reoxidized to $CuCl_2$ according to the following equation:

(4) $\quad 2CuCl + 2HCl + \tfrac{1}{2}O_2 \rightarrow 2CuCl_2 + H_2O$

The degree of oxidation of the catalyst expressed by the molar fraction:

$$\frac{Cu^{++}}{Cu^{++} + Cu^+}$$

can be varied within certain limits by varying the composition of the olefin oxygen mixture. With a lower oxygen content it is lower than with a higher oxygen content as in such instance the reduction of the $CuCl_2$ by the olefin is favored. It is expedient to carry out the reaction with the catalyst at a low degree of oxidation, as oxidative and chlorinating side reactions are favored at higher degrees of oxidation.

In some instances it suffices to adjust the degree of oxidation to about 0.6–0.8. However, it is often advantageous to work at lower degrees of oxidation, if desired, even below 0.2.

For sake of safety, it is expedient to employ an olefin-oxygen mixture the composition of which is above the upper explosive limit. With ethylene this lies at about 80% in mixture with oxygen. As the olefin and oxygen are used up in the stoichiometric ratio of 2:1 the olefin concentration will increase during the course of the reaction. This can be compensated for by subsequent supply of additional oxygen, for example, when the reaction is carried out in a tower or tube reactor at a point subsequent to that of the original supply and, in the case it is carried out in a vessel provided with a stirrer, at a subsequent time after the reaction has progressed for some time.

In order to equalize the load on the distillation column serving to separate the reaction products distilling off during the periodic reductions in pressure, it is expedient to carry out the reaction in a plurality of reactors in which the periods of increased and decreased pressures are staggered with respect to each other. It is expedient to provide an intermediate container for receipt of the crude product delivered by the reactors from which the supply to the distillation column is taken.

When the reaction is carried out by passing a gas mixture through the catalyst solution or suspension it is expedient to remove the reaction products entrained by the unreacted portion of the gases before the latter are recycled. This, for example, can be effected by known measures, such as, for example, condensation or scrubbing, for example, with the carboxylic acid employed.

As has already been indicated, the process according to the invention can also be employed when the reaction is carried out in the gas phase. In such case the olefin or olefin-oxygen mixture is passed together with vapor phase carboxylic acid over a solid carrier supported catalyst in which the carrier supports the compound of the metal of the platinum group, the oxidizing agent and the carboxylic acid salt. A suitable supported catalyst, for example, is active carbon carrying 5% by weight of $PdCl_2$, 10% by weight of $MnO_2$ and 10% by weight of NaOAC which, for example, can be prepared by impregnating active carbon with a solution of $PdCl_2$, $MnO_2$ and NaOAC in glacial acetic acid and heating such mixture with hot air in a drum drier to remove the acetic acid. During the periods of increased pressure the carboxylic acid and reaction products deposit on the catalyst and are driven off during the periods of decreased pressure.

The following examples will serve to illustrate the invention with reference to several embodiments thereof.

*Example 1*

500 g. of sodium acetate, 200 g. of copper acetate [$Cu(C_2H_3O_2)_2 \cdot H_2O$], 60 g. of sodium chloride, 6 g. of $PdCl_2$ and 5 liters of pure acetic acid were placed in an enamelled stirring autoclave of 16 liters' capacity. The mixture was heated to 120° C. while stirring and then saturated with ethylene at 40 atmospheres. Then oxygen was introduced portionwise under pressure in such a way that the ratio of oxygen to ethylene did not exceed 1:6. The introduction of the oxygen was continued until a drop in pressure no longer occurred between the additions, which was the case after 12 minutes. The exothermic heat of reaction caused the temperature in the autoclave to rise to 125–135° C. The pressure in the autoclave was reduced to about atmospheric pressure while supplying additional heat whereupon the reaction products and a portion of the acetic acid remaining in the autoclave distilled off. 1015 g. of vinyl acetate and 152 g. of acetaldehyde were produced. After the acetic acid had been replenished in the catalyst solution it was again used for reaction with an olefin oxygen mixture.

*Example 2*

A reactor was employed consisting of a tube 6 meters high having an inner diameter of 70 mm. which was filled ⅔ full with the catalyst distributed in acetic acid. Means for supplying an olefin oxygen mixture were provided at the bottom of such tube and an evidenced portion was provided at the top of the tube to hinder entrainment of the catalyst by the gas mixture leaving the top of the tube. For sake of safety a separator was also connected thereto. The reaction products and reactants which were entrained by the unreacted gases, namely, vinyl acetate, water and acetic acid were condensed under pressure in a cooler. The pressure in the apparatus was adjusted by a valve in the conduit connected to the outlet of the cooler. The unconverted gas after leaving the cooler and replenishment with the quantity of olefin and oxygen consumed was recycled to the reactor. The condensate from the cooler was collected in a receiver and separated in a multistep distillation. The acetic acid recovered thereby was recycled to the reactor. All parts of the apparatus which came into contact with the catalyst were constructed of titanium or clad with titanium.

Before beginning the reaction the reactor tube was filled ⅔ full with acetic acid containing 0.8 g. of $PdCl_2$, 40 g. of $Cu(C_2H_3O_2)_2 \cdot H_2O$, 12 g. of NaCl and 100 g. of $NaC_2H_3O_2$ per liter. A reaction temperature of 125–130° C. was maintained and about 3 m.³ of an ethylene-oxygen mixture were introduced into the bottom of the reaction per hour, the concentration of the oxygen therein was so adjusted that a sample of the catalyst withdrawn after operation did not contain more than 10% of the total copper content as copper (II). An oxygen content of about 10–15% was necessary for this purpose. The pressure in the reactor was raised to 30 atmospheres and reduced to 2 atmospheres in periods of 20–30 minutes. The average yield of vinyl acetate per hour was 0.8–1 kg. and in addition 200 g. of acetaldehyde.

It is also possible to supply only a portion of the oxygen together with the ethylene supplied to the bottom of the reactor, for example, by supplying an ethylene oxygen mixture containing only 10% of oxygen to the bottom of the reactor while supplying the remainder of the oxygen at about the midsection of such reactor tube. By variation of the additional oxygen, a more stable degree of oxidation can be achieved.

*Example 3*

250 cc. of an acetic acid solution containing 2.5 g. of bis allyl palladium chloride [$(C_3H_5PdCl_2)$], 100 g. of water free $CuCl_2$, 42 g. of $Cu(C_2H_3O_2) \cdot H_2O$, 92 g. of $NaC_2H_3O_2$ and 100 g. acetic acid anhydride per liter of acetic acid were placed in a one liter titanium clad autoclave. After the autoclave was closed, 60 g. of propylene were condensed therein and after heating to 75–80° C. which caused a pressure of 22–24 atmospheres in the autoclave, 5 atmospheres of oxygen were pumped in. After about 30 minutes' reaction the pressure in the autoclave had sunk to 22 atmospheres. The pumping in of oxygen was repeated twice and subsequently the pressure released in the autoclave and the reaction products distilled off at a pressure of about 100 torr. About 20 g. of reaction products were obtained of a composition of about:

| | Percent |
|---|---|
| Allyl acetate | 30 |
| Isopropenyl acetate | 20 |
| n-Propenyl acetate | 10 |
| Isopropyl acetate | 10 |
| Acetone | 15 |
| Acrolein | 5 |
| Other products | 10 |

*Example 4*

In a U-shaped glass tube of 1 liter capacity there is placed a catalyst which had been obtained by impregnating of active charcoal with a solution of 5% of palladium chloride, 10% of manganese dioxide and 10% of sodium acetate in glacial acetic acid (in each case the percents are calculated on the weight of the active charcoal). The reaction is carried out by passing over 80 liters per hour of a gas mixture containing 80 parts by volume of ethylene and 20 parts by volume of oxygen, which is charged with 50 g. of acetic acid vapor per hour, at 150° C. and under periodically increasing the pressure to 2.5 to 3 atmospheres abs. and reducing to atmospheric pressure. The periods employed are ½ hour each. The reaction mixture leaving the reactor is condensed partially to separate the major portion of acetic acid. The remaining part of the mixture is now freed from the residual gas by further condensation and the vinyl acetate is obtained by distillation therefrom. After replacing the consumed portions, acetic acid and the residual gas is recycled. There are obtained accordingly 5 g. of vinyl acetate per hour.

We claim:

1. In a process for the production of ethylenically unsaturated esters of the formula:

$$RCOOCX=CX_2$$

from a carboxylic acid of the formula RCOOH and an olefin of the formula $CHX=CX_2$ wherein R is lower alkyl and each X is selected from the group consisting of hydrogen and alkyl in the presence of a catalyst combination comprising a palladium salt, a salt of a multivalent heavy metal selected from the group consisting of iron, copper, manganese, cobalt, tin, lead, antimony and vanadium in their higher valent stage, as an oxidizing agent for metallic palladium, and a lower mono-alkanoic acid salt of a metal selected from the group consisting of alkali metals and alkaline earth metals, the steps of reacting the olefin with the carboxylic acid under superatmospheric pressure of 2.5 to 50 atmospheres at a temperature between 70 and 170° C. in a reaction space in contact with the catalyst combination maintained in said reaction space, the degree of oxidation of the catalyst combination being less than 0.2, periodically reducing said pressure in said reaction space substantially and distilling off the ester produced from the reaction space at such reduced pressure.

2. The process of claim 1 in which such salt of a multivalent heavy metal is a cupric salt.

3. The process of claim 1 in which the pressure under which the reaction is carried out is at least 10 atmospheres.

4. The process of claim 1 in which the olefin is supplied to said reaction space as a mixture with oxygen in which the concentration of the olefin is above the upper explosive limit and additional oxygen is subsequently supplied to the catalyst solution to replenish oxygen consumed in the reaction.

References Cited by the Examiner

UNITED STATES PATENTS 3,190,912   6/1965   Robinson _____ 260—497

FOREIGN PATENTS 608,610   3/1962   Belgium.
137,511   4/1960   U.S.S.R.
145,569   5/1962   U.S.S.R.

OTHER REFERENCES

Smidt, Angew. Chem., vol. 71, pp. 176–182 (1959).
Moiseev, Doklady Akademii Nauk USSR, vol. 133, pp. 377–380.
Smidt, Chemistry and Industry, Jan. 13, 1962, pp. 54–61.

LORRAINE A. WEINBERGER, *Primary Examiner.*

LEON ZITVER, *Examiner.*

V. GARNER, D. P. CLARKE, *Assistant Examiners.*